United States Patent
Singleton et al.

(10) Patent No.: US 8,474,495 B2
(45) Date of Patent: Jul. 2, 2013

(54) DEVICE FOR TRANSFER OF PRODUCT FROM REFILL CONTAINER TO APPLICATOR CONTAINER WITHOUT EXPOSURE TO ATMOSPHERE

(76) Inventors: Ian Singleton, Darwen (GB); David Taylor, Chorley (GB)

( * ) Notice: Subject to any disclaimer, the term of this patent is extended or adjusted under 35 U.S.C. 154(b) by 310 days.

(21) Appl. No.: 12/845,469

(22) Filed: Jul. 28, 2010

(65) Prior Publication Data
US 2011/0011859 A1  Jan. 20, 2011

(51) Int. Cl.
*B65B 1/04* (2006.01)
*B65D 17/42* (2006.01)

(52) U.S. Cl.
USPC ......... 141/330; 141/329; 141/364; 141/383; 206/222; 222/81

(58) Field of Classification Search
USPC ... 141/18, 329–330, 383–384, 364; 220/86.1; 206/222; 137/68.29
See application file for complete search history.

(56) References Cited

U.S. PATENT DOCUMENTS

| | | | |
|---|---|---|---|
| 990,561 A | | 4/1911 | Kandlbinder |
| 2,767,744 A | * | 10/1956 | Beerman ............... 141/319 |
| 4,614,437 A | * | 9/1986 | Buehler ............... 366/130 |
| 4,678,380 A | | 7/1987 | Zahuranec et al. |
| 4,726,264 A | | 2/1988 | Bost |
| D301,540 S | | 6/1989 | Zahuranec et al. |
| 4,898,293 A | | 2/1990 | Morel |
| D319,957 S | | 9/1991 | Bergmeister |
| D388,660 S | | 1/1998 | Grundl |
| D404,623 S | | 1/1999 | Burrell |
| 6,237,654 B1 | * | 5/2001 | Sheyer ............... 141/330 |
| 6,527,110 B2 | * | 3/2003 | Moscovitz ............... 206/222 |
| 6,533,113 B2 | * | 3/2003 | Moscovitz ............... 206/222 |
| D474,084 S | | 5/2003 | Yip |
| 6,779,213 B2 | | 8/2004 | Yip |
| 6,986,345 B2 | * | 1/2006 | Kolb ............... 126/263.08 |
| D519,795 S | | 5/2006 | Hayward |
| D553,926 S | | 10/2007 | Velez |
| 7,308,915 B2 | * | 12/2007 | Johns et al. ............... 141/100 |
| D637,466 S | * | 5/2011 | Singleton et al. ............... D8/41 |
| 2004/0112177 A1 | | 6/2004 | Yip |
| 2007/0181522 A1 | * | 8/2007 | Davidson ............... 215/228 |

FOREIGN PATENT DOCUMENTS

| | | |
|---|---|---|
| EP | 0293290 A1 | 11/1988 |
| EP | 1145702 A2 | 10/2001 |
| EP | 1498097 A2 | 1/2005 |
| EP | 1829518 A1 | 9/2007 |
| FR | 2532280 A1 | 3/1984 |
| FR | 2850088 A1 | 7/2004 |
| GB | 739485 | 11/1955 |
| GB | 2050184 A | 1/1981 |
| WO | 2005056402 A1 | 6/2005 |

* cited by examiner

*Primary Examiner* — Timothy L Maust
*Assistant Examiner* — Timothy Kelly
(74) *Attorney, Agent, or Firm* — The Webb Law Firm

(57) ABSTRACT

An open ended cylindrical connector device includes a) an internally smooth-bored first docking port at one end; b) an internally screw threaded second docking port at the other end; and c) a unidirectional hole-cutter/membrane-piercing arrangement deployed across the diameter of the cylindrical device with its cutting/piercing edges occupying the first docking port. The product is transferred from a sealed donating container to a receiving container by screwing the receiving container into the second docking port and subsequently pressing a sealed donating container into the first docking port. The seal on the donating container is punctured by the hole-cutter and releases the product for transfer through the cylindrical connector to the receiving container. The donating container docking port may be closed with a removable cap and the cylindrical connector used as a donating container screw cap.

9 Claims, 3 Drawing Sheets

DEVICE FOR TRANSFER OF PRODUCT FROM REFILL CONTAINER TO APPLICATOR CONTAINER WITHOUT EXPOSURE TO ATMOSPHERE

AREA OF INVENTION

The invention concerns a device designed to enable the transfer of a measured quantity of water soluble solid or concentrated aqueous product from a storage container to a re-usable spray applicator vessel for dissolution in or dilution with a known volume of water, whilst confining the material being transferred to its container, the device and applicator vessel.

BACKGROUND TO THE INVENTION

A number of devices for transferring and diluting liquids within the confines second container are found in the literature. For example, Jones (GB739485) discloses a cylindrical connecting device, threaded at both ends of the cylinder and possessing a filter unit at its centre designed to filter two-phase dispersions from one container into the other. However the device of Jones is used with open systems and disclosed no means of piercing or otherwise penetrating a protective membrane across the neck of either of the containers, thus making it impossible to dilute or dissolve from a sealed container.

Bochtler (WO2005/056402) and Morel (EP0293290) also disclose screw threaded cylindrical connectors both of which incorporate a top hat type circular hole cutter at the centre of the cylinder. However, neither discloses means of preventing the circular pieces of membrane detached by the twisting motion of the hole-cutter getting into the transferred material or diluted solution and interfering with subsequent processes e.g. spraying.

Both Nipro Corp (EP1145702) and Cavazza (GB2050184) disclose cylindrical connectors which incorporate non-threaded, thrust entry for the refill container. However, the former is clearly a medical instrument designed to prepare injections and requires the use of a separate syringe to affect the transfer while the latter is effectively confined to the transfer of liquids by virtue of the relatively narrow and long connecting channels, between the two containers which are a requirement of the design.

The dissolution of water soluble solid (tablet, granule, pellet or powder) within a closed spray applicator system is also known. Known systems designed to dissolve water soluble solids suffer the same drawbacks as discussed above and usually require formulation change unacceptable to the functionality of the product and can have safety drawbacks. Systems based on water soluble sachets etc additionally present difficulties of spray-head blockage from residues of the packaging material or the inconvenience of having to adjust the chemistry of the water used to create the diluted solution.

Accordingly, all the pre-disclosed transfer systems fail to meet our current requirements of, efficiency and accuracy of transfer, lack of contamination of the prepared solution from the refill container packaging system, possible integration of the cylindrical connector device with the refill material container, re-usability of the cylindrical connector device and low manufacturing costs The present invention avoids all the problems and difficulties associated with prior art dissolution and dilution systems and devices.

SUMMARY OF THE INVENTION

This invention concerns a cylindrical connecting device one end of which is internally threaded to accommodate the external thread on the neck of a spray pump vessel while the other end is smooth bored with an internal diameter accepting, with snug fit, the external thread on the neck of a refill container. The threaded and smooth bore ends of the connector are separated by a unidirectional and substantially open ended dome shaped hole-cutter/membrane piercing arrangement deployed across the diameter of the cylindrical device with its cutting/piercing edges occupying the smooth bored end of the device.

The invention is designed to work with two conventional components:

- a refill container, containing a known quantity of the soluble solid or concentrated liquid including water soluble solids or concentrated aqueous solutions, possessing an externally threaded neck, compatible with both the internally threaded and the smooth bore ends of the invention, the mouth of the refill container being sealed with a protective anti-contamination membrane; and,
- a graduated spray-pump vessel with a spray-pump head fitted by way of an external thread on the neck of the spray-pump vessel which is compatible with the internal thread of the cylindrical connecting device. During the transfer or dilution operation the spray pump head is removed and replaced by the threaded docking port of the cylindrical connecting device.

In use, the invention is screwed down onto a re-usable spray-pump vessel, with the spray-pump head removed and filled to the required volume with liquid/water. The neck of the refill container, which contains a known amount of material to be transferred, is pushed down firmly onto the hole-cutter/until the hole-cutter/membrane piercing arrangement partially penetrates the protective anti-contamination membrane across the neck of the refill container, thus releasing its contents to pass through the connecting cylinder into the spray-pump vessel under gravity. Following dissolution or dilution the system may be inverted several times to capture all the concentrate refill container contents, the cylindrical connecting device, of the invention, is removed from the spray-pump vessel and the spray-pump-head is refitted. An accurately known concentration of the material is achieved in the spray-pump vessel without risk of the material originally in the concentrate refill container being lost. The spray-pump vessel and the invention (cylindrical connector) are re-usable.

BRIEF DESCRIPTION OF THE DRAWINGS

The invention will now be described in detail with reference to FIGS. 1-4.

The key to the figures is as follows.

| KEY | DESCRIPTION |
| --- | --- |
| 1 | Screw threaded docking port (second docking port). |
| 2 | Smooth bore docking port (first docking port). |
| 3 | Membrane piercing cutting arrangement. |
| 4 | Annular platform/bulkhead. |
| 5 | Cutting arches. |
| 6 | Membrane piercing tip. |
| 7 | Annular band. |
| 8 | Removable cap. |
| 9 | Refill container protective membrane closure. |
| 10 | Refill container. |
| 12 | Spray pump container. |

DETAILED DESCRIPTION OF THE INVENTION

Figure 1:
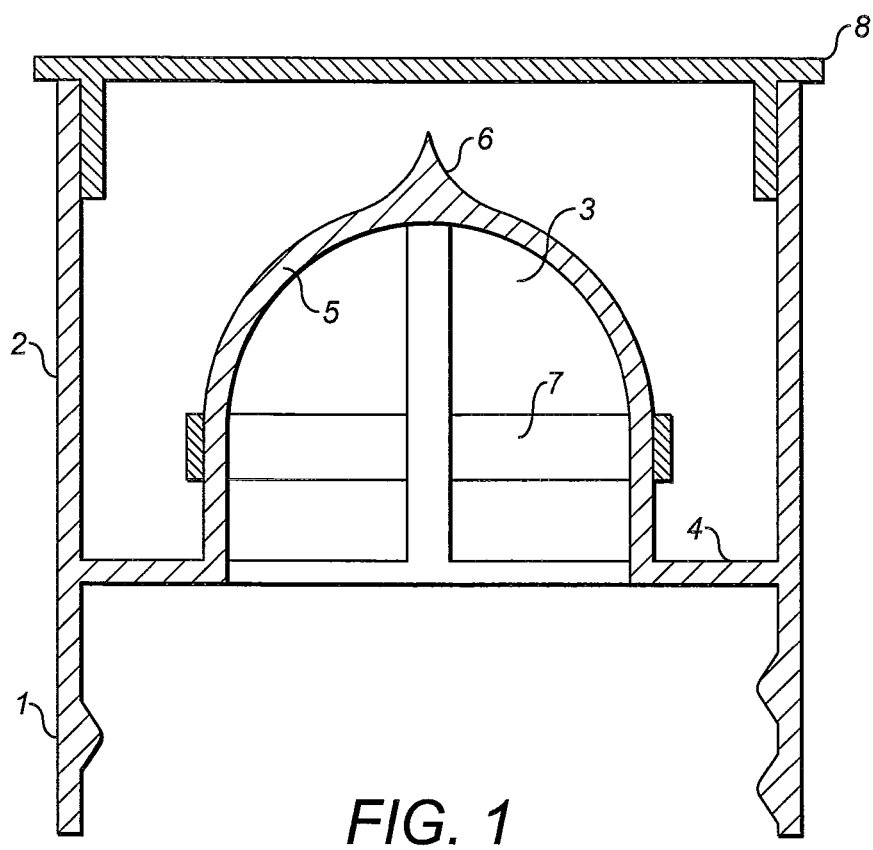
FIG. 1 shows the cylindrical connecting device in cross-section.

FIG. 1 shows the cylindrical connecting device in cross-section. The device may be formed from any suitable plastic or plastic/metallic composite material by any suitable manufacturing process, including injection moulding. An internal female screw thread (1) runs from one end of the cylinder toward the centre and is separated from a smooth bore internal surface (2) running from the other end of the cylinder by a membrane piercing arrangement (3) straddling the internal diameter of the cylinder and emanating from a bulkhead (4) running around the inside of the cylinder wall which also separates the smooth bore docking port (first docking port) from the threaded docking port (second docking port) ends of the cylinder.

The membrane piercing arrangement (3) consists of a plurality of cutting arches (5) radiating out with rotational symmetry from the central axis of the cylinder to form a skeleton dome. The upper surface of the arches is formed as a cutting edge and the arches are topped at the centre of the cylinder with a pointed membrane piercing tip (6). The arches are displaced from the smooth bore surface by the bulkhead (4) sufficiently to allow the neck of a refill container to fit over the membrane piercing arrangement. An annular band (7) runs between the arches near their base to strengthen the membrane piercing arrangement and ensures the correct drape of the pierced and shredded membrane. The device is optionally closed at the smooth bore end by a simple removable cap (8).

Figure 2:
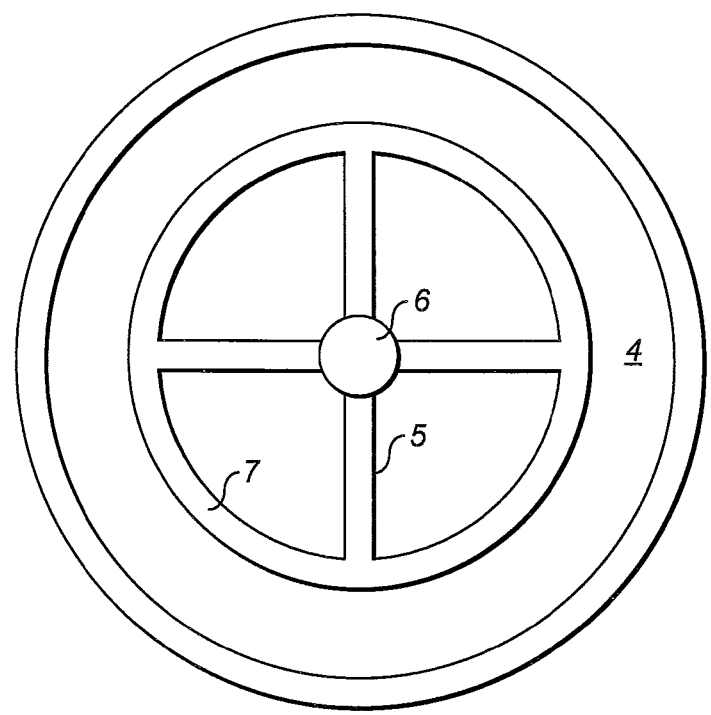
FIG. 2 shows a top view of the device with the removable cap removed.

FIG. 2 shows a top view of the device with the removable cap removed. The piercing tip (6), cutting arches (5), annular band (7) and the bulkhead (4) the latter of which separates the membrane piercing arrangement from the cylinder wall are all visible. It must be understood that any number of cutting arches (5) may be employed and that the profile of the cutting arches may be varied from the vertical e.g. spiral.

Figure 3:
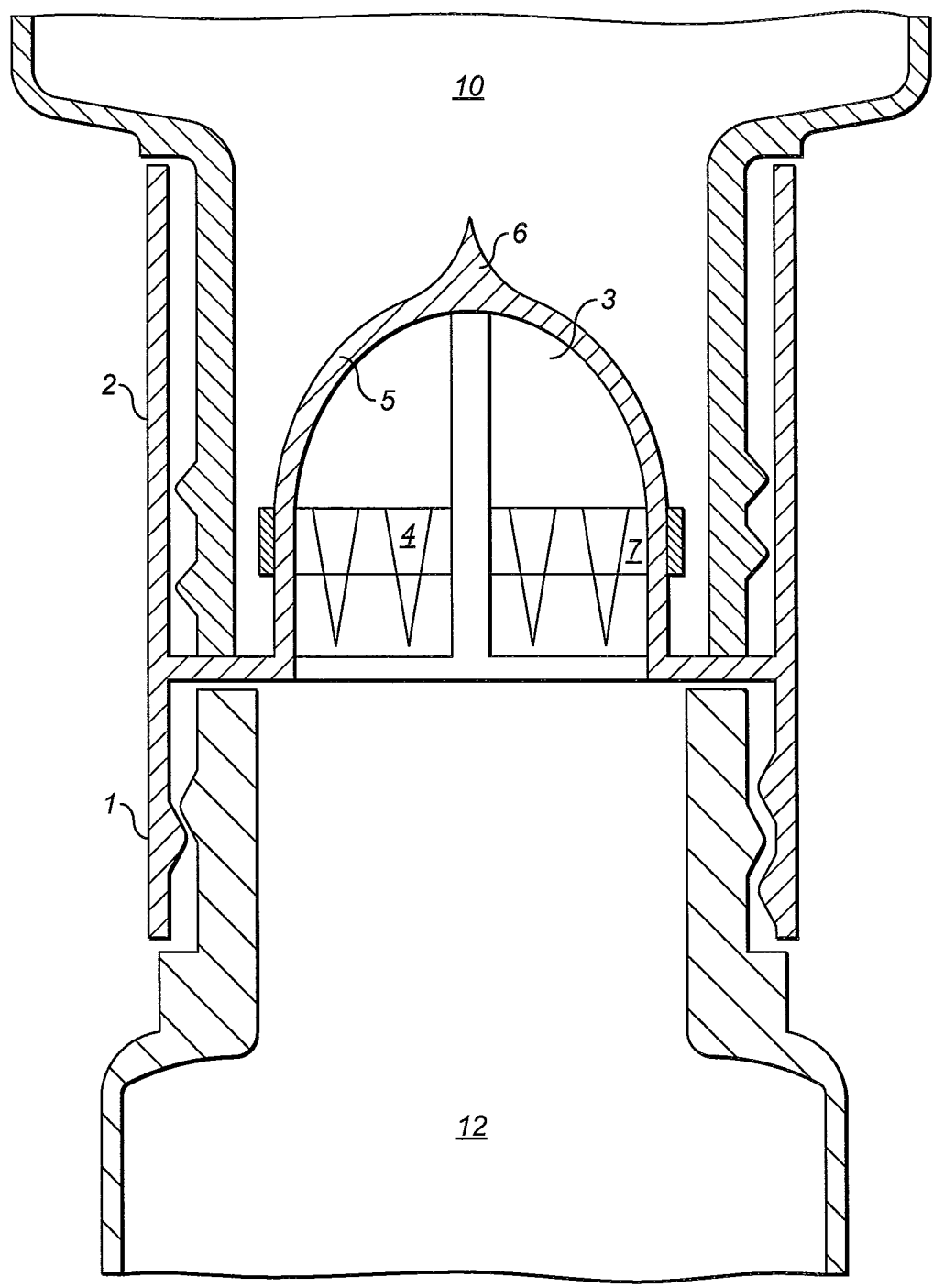
FIG. 3 shows in cross-section the device in use with its removable cap removed.

FIG. 3 shows, in cross-section, the device in use with its removable cap (8) removed and a refill container (10) pressed down over the membrane piercing arrangement (3), with the now shredded membrane (9) draped over the annular band (7). The contents of the refill container have fallen through the membrane piercing arrangement into the Spray-pump container (12).

Figure 4:
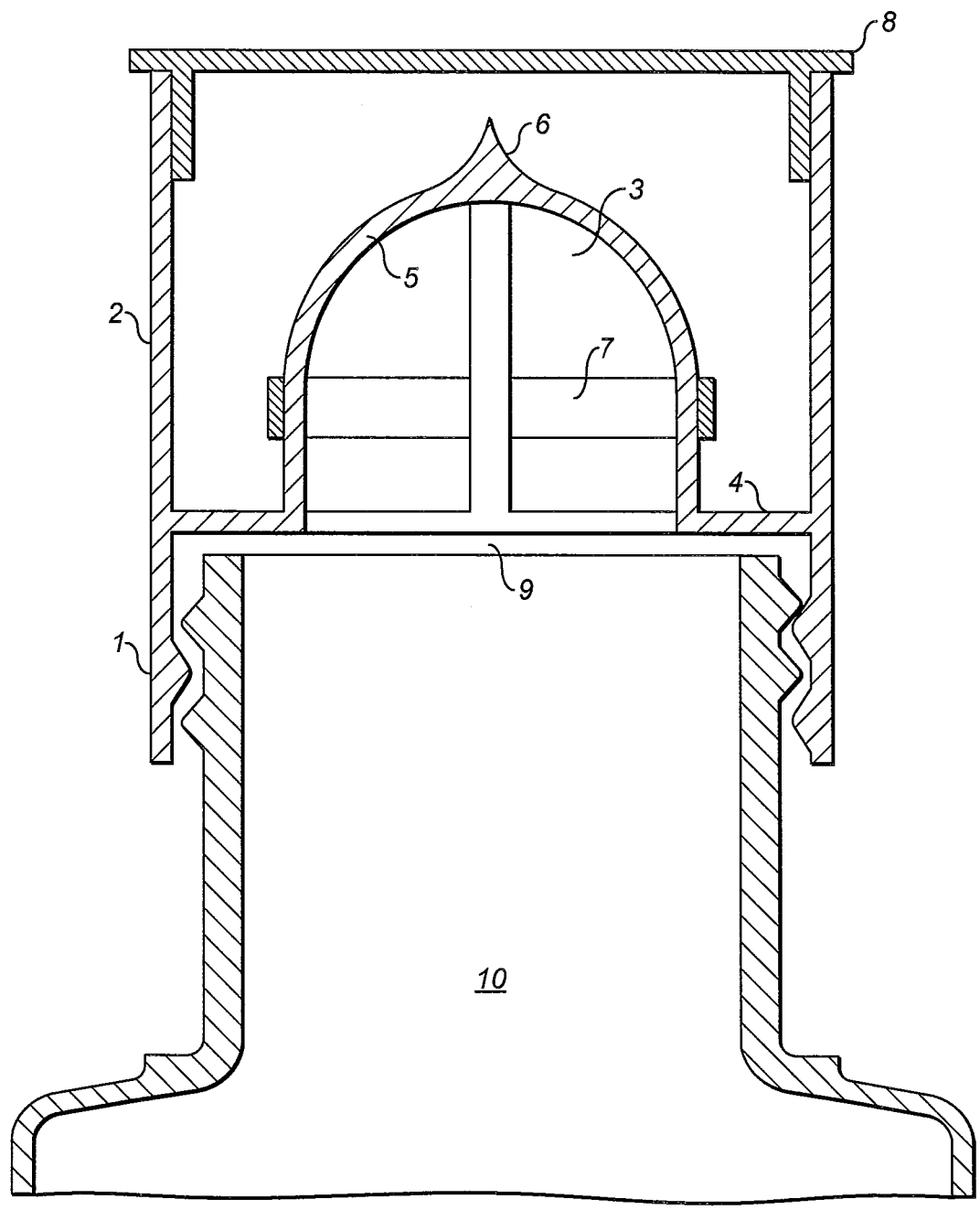
FIG. 4 shows in cross section the device when it is used as a closure for a refill container.

FIG. 4 shows in cross section the device when it is, optionally, used as a closure for a refill container (10).

USES OF THE INVENTION

Embodiments of the invention will now be discussed with reference to the figures. In a first embodiment the invention is used to prepare accurate working strength aqueous or other liquid solutions of powdered product or, by dilution, from concentrated liquid products. In this embodiment (FIG. 3) the cylindrical connector, with its cap (8) removed, is firmly threaded onto a suitable spray vessel (12), with the spray-head removed, containing a known volume of water (see drawing 3). A sealed concentrate refill container (10) containing a known quantity of powdered product or concentrated liquid product, and sealed across the neck with an anti-contamination membrane (9), is inserted into the free end of the cylindrical connector and pushed firmly down until the membrane piercing arrangement penetrates and shreds without detaching the protective anti-contamination membrane (9) to release the contents of the refill container (10) to fall through into the spray-vessel. Once the concentrated product is dissolved or diluted the assembly is inverted briefly several times to clear all product from the concentrate refill container. Once the cylindrical connector and concentrate refill container are removed from the spray vessel and the spray-head is replaced the spray pump is ready to deliver a known concentration of working strength solution. It is understood that the spray-vessel may be replaced by any container with a male-threaded neck compatible with the female thread of the cylindrical connector.

In a second embodiment of the invention (see FIG. 4) the cylindrical connector is used as a screw-cap for the sealed refill container (10).

What is claimed is:

1. An open ended cylindrical connector to affect the transfer of material between two containers comprising:
   a) container docking ports at both ends of the cylindrical connector; and
   b) a unidirectional substantially open ended hole-cutter located between and aligned co-axially with said container docking ports with the cutting-edge facing a first container docking port, said docking parts being respectively adapted to receive a neck of a donating container, at the first docking port, and a neck of a receptor container, at a second docking port, thus incorporating both containers into a single closed system;
   wherein the unidirectional substantially open hole-cutter includes a plurality of half-arches, the outer surfaces of which are formed as a cutting edge, radiating out from the central axis of the cylinder with rotational symmetry to form a skeletal dome; and a pointed membrane piercing spike mounted centrally on top of the conjunction of the half-arches.

2. The open ended cylindrical connector as claimed in claim 1, wherein:
   an internal surface of the first container docking port is a smooth bore capable of accepting an externally threaded neck of the donating container by a simple downward thrusting motion; and,
   an internal surface of the second container docking port is screw-threaded and capable of accepting a male screw threaded neck of the receptor container.

3. The open ended cylindrical connector as claimed in claim 1, wherein the unidirectional, substantially open, hole-cutter is attached to an internal wall of the cylindrical connector by an annular platform/bulkhead which effectively separates the first and the second docking ports; and displaces the unidirectional substantially open hole-cutter from the internal surface of the first container docking port sufficient to allow the neck of a refill container to pass over it.

4. The open ended cylindrical connector as claimed in claim 3, wherein the distance between the annular platform/bulkhead and an end of the first container docking port is no more than the length of the neck of the donating container.

5. The open ended cylindrical connector as claimed in claim 3, wherein the maximum height of the unidirectional substantially open hole-cutter above the annular platform/bulkhead is from 50% to 95% of the height of the first container docking port height above the internal annular platform/bulkhead.

6. The open ended cylindrical connector as claimed in claim 3, wherein the height of the unidirectional substantially open hole-cutter above the annular platform/bulkhead and the width of said annular platform/bulkhead are adjusted so that a mouth of the donating container pressed fully home into the first container docking port overlaps the cutting edge to a minimum of 50% and a maximum of 90% of the height of the unidirectional substantially open hole-cutter.

7. The open ended cylindrical connector as claimed in claim 3, wherein the arched cutting edges of the unidirectional substantially open hole-cutter rise from the annular platform/bulkhead in a non-vertical manner such as a spiral.

8. The open ended cylindrical connector as claimed in claim 1, wherein the plurality of arched cutting edges are linked together, at a point at which they are still parallel to the wall of the cylindrical connector, by an annular band running between them.

9. The open ended cylindrical connector as claimed in claim 1, wherein the open end of the first container docking port is closed with a removable cap.

* * * * *